United States Patent
Hopeman et al.

(10) Patent No.: US 10,558,659 B2
(45) Date of Patent: Feb. 11, 2020

(54) TECHNIQUES FOR DICTIONARY BASED JOIN AND AGGREGATION

(71) Applicant: Oracle International Corporation, Redwood Shores, CA (US)

(72) Inventors: Albert Hopeman, Arlington, MA (US); Martin Roth, Ashland, MA (US); Ekrem Soylemez, Lexington, MA (US); Adam Kociubes, Bedford, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 589 days.

(21) Appl. No.: 15/268,521

(22) Filed: Sep. 16, 2016

(65) Prior Publication Data
US 2018/0081939 A1  Mar. 22, 2018

(51) Int. Cl.
*G06F 16/00* (2019.01)
*G06F 16/2453* (2019.01)
(Continued)

(52) U.S. Cl.
CPC .... *G06F 16/24537* (2019.01); *G06F 16/2237* (2019.01); *G06F 16/2282* (2019.01); *G06F 16/285* (2019.01)

(58) Field of Classification Search
CPC ........... G06F 16/24537; G06F 16/2282; G06F 16/221; G06F 16/2237; G06F 16/2456; G06F 16/27; G06F 16/285
(Continued)

(56) References Cited

U.S. PATENT DOCUMENTS 5,359,724 A    10/1994  Earle
5,848,408 A    12/1998  Jackobsson
(Continued)

OTHER PUBLICATIONS

Kociubes, U.S. Appl. No. 14/806,576, filed Jul. 22, 2015, Notice of Allowance, dated Apr. 11, 2018.
(Continued)

*Primary Examiner* — Vincent F Boccio
(74) *Attorney, Agent, or Firm* — Hickman Palermo Becker Bingham LLP

(57) ABSTRACT

Techniques are described herein for performing join and aggregation operations for a received query using column dictionaries. In an embodiment, a query is received that requests to aggregate a measure column of a fact table based on an aggregate function and join the fact table with a dimension table on a join key column. Data of the fact table may be stored in one or more storage data units, for example a particular data portion of the fact table may be stored on a particular data storage unit. The respective data portion may include one or more column vectors corresponding to one or more columns of the fact table in which a cell element corresponds to a value at a particular row and a particular column of the one or more columns of the fact table. The cell element of the one or more column vectors includes a dictionary encoded value of the value at the particular column and row. This dictionary encoded value is mapped to the value of by a dictionary data structure of the particular column. In an embodiment, in response to receiving the query, using the query, for a particular storage unit, the DBMS identifies a fact join key vector of the one or more column vectors of the particular data storage unit and a fact join key dictionary data structure corresponding to the fact join key vector. The DBMS generates a dictionary-grouping key mapping based on the fact join key dictionary data structure and a dense grouping key data structure. Such a
(Continued)

dense grouping key data structure represents a mapping of unique dimension join key values of the join key column of the dimension table to grouping key values of a grouping key of the dimension table. Based on the generated dictionary-grouping key mapping and the fact join key vector, the DBMS may generate a transformed vector, which represents the grouping key values of the dictionary-grouping key mapping arranged according to the fact join key vector. Alternatively, the dictionary-grouping key mapping may be directly accessed during the aggregation. Based on the generated transformed vector and/or by directly accessing the dictionary-grouping key mapping, the DBMS aggregates a column vector in that particular data storage unit that corresponds to the measure column in the received query.

30 Claims, 7 Drawing Sheets

(51) Int. Cl.
  *G06F 16/28* (2019.01)
  *G06F 16/22* (2019.01)
(58) Field of Classification Search
  USPC .......................................................... 707/714
  See application file for complete search history.

(56) References Cited

U.S. PATENT DOCUMENTS

| | | | |
|---|---|---|---|
| 5,905,985 A | 5/1999 | Malloy | |
| 5,943,666 A | 8/1999 | Kleewein | |
| 5,960,428 A | 9/1999 | Lindsay | |
| 6,298,342 B1 | 10/2001 | Graefe | |
| 6,317,750 B1 | 11/2001 | Tortolani et al. | |
| 6,341,281 B1 | 1/2002 | MacNicol | |
| 6,345,267 B1 | 2/2002 | Lohman | |
| 6,353,828 B1 | 3/2002 | Ganesh | |
| 6,397,195 B1 | 5/2002 | Pinard et al. | |
| 6,397,204 B1 | 5/2002 | Liu | |
| 6,405,208 B1 | 6/2002 | Raghavan et al. | |
| 6,385,604 B1 | 7/2002 | Bakalash et al. | |
| 6,446,063 B1 | 9/2002 | Chen | |
| 6,460,045 B1 | 10/2002 | Aboulnaga et al. | |
| 6,484,179 B1 | 11/2002 | Roccaforte | |
| 6,529,896 B1 | 3/2003 | Leung et al. | |
| 6,618,729 B1 | 9/2003 | Bhashyam et al. | |
| 6,678,674 B1* | 1/2004 | Saeki | G06F 16/2452 707/999.004 |
| 6,711,563 B1 | 3/2004 | Koskas | |
| 6,775,682 B1 | 8/2004 | Ballamkonda | |
| 6,959,304 B1 | 10/2005 | Teig et al. | |
| 6,965,891 B1 | 11/2005 | Jakobsson | |
| 7,020,661 B1* | 3/2006 | Cruanes | G06F 16/2456 707/999.103 |
| 7,028,046 B2 | 4/2006 | Anjur et al. | |
| 7,324,991 B1 | 1/2008 | Anjur | |
| 7,337,163 B1 | 2/2008 | Srinivasan | |
| 7,366,730 B2 | 4/2008 | Greenfield et al. | |
| 7,392,248 B2 | 6/2008 | Bakalash | |
| 7,467,127 B1 | 12/2008 | Baccash et al. | |
| 7,617,312 B2 | 11/2009 | Tummalapalli | |
| 7,725,425 B2 | 5/2010 | Smartt | |
| 7,734,652 B2 | 6/2010 | Tamayo | |
| 7,769,733 B2 | 8/2010 | Chen et al. | |
| 7,774,303 B2 | 8/2010 | Shoup | |
| 7,797,320 B2 | 9/2010 | Thomsen | |
| 8,001,112 B2 | 8/2011 | Dombroski et al. | |
| 8,041,670 B2 | 10/2011 | Bakalash | |
| 8,200,612 B2 | 6/2012 | Soylemez | |
| 8,209,208 B2 | 6/2012 | Kearney et al. | |
| 8,311,975 B1 | 11/2012 | Gonsalves | |
| 8,554,761 B1 | 10/2013 | Ahmed | |
| 8,788,453 B2 | 7/2014 | Bakalash | |
| 8,799,209 B2 | 8/2014 | Bakalash | |
| 9,183,254 B1 | 11/2015 | Cole | |
| 10,067,954 B2* | 9/2018 | Kociubes | G06F 16/2453 |
| 2002/0095397 A1 | 7/2002 | Koskas | |
| 2002/0095421 A1 | 7/2002 | Koskas | |
| 2003/0208484 A1 | 11/2003 | Chang | |
| 2004/0153435 A1 | 8/2004 | Gudbjartsson et al. | |
| 2004/0225639 A1 | 11/2004 | Jakobsson | |
| 2005/0033741 A1 | 2/2005 | Dombroski et al. | |
| 2006/0026115 A1 | 2/2006 | Ahmed | |
| 2006/0184519 A1 | 8/2006 | Smartt | |
| 2006/0235823 A1 | 10/2006 | Chong | |
| 2007/0027860 A1 | 2/2007 | Bestgen | |
| 2007/0083489 A1 | 4/2007 | Lawande | |
| 2007/0233648 A1 | 10/2007 | Zuzarte | |
| 2007/0239673 A1 | 10/2007 | Barsness | |
| 2007/0250473 A1 | 10/2007 | Larson | |
| 2008/0059415 A1 | 3/2008 | Bakalash | |
| 2008/0172354 A1 | 7/2008 | Zuarte | |
| 2008/0215544 A1 | 9/2008 | Galindo-Legaria | |
| 2009/0112793 A1 | 4/2009 | Ahemd | |
| 2009/0182720 A1 | 7/2009 | Cain et al. | |
| 2009/0265335 A1 | 10/2009 | Hoffman | |
| 2009/0281985 A1 | 11/2009 | Aggarwal | |
| 2010/0088309 A1 | 4/2010 | Petculescu | |
| 2010/0250517 A1 | 9/2010 | Bendel | |
| 2010/0299337 A1 | 11/2010 | Aurin | |
| 2010/0299367 A1 | 11/2010 | Chakrabarti et al. | |
| 2011/0040745 A1 | 2/2011 | Zaydman | |
| 2011/0055246 A1 | 3/2011 | Le Biannic et al. | |
| 2011/0137917 A1 | 6/2011 | Boland et al. | |
| 2011/0145244 A1 | 6/2011 | Kim et al. | |
| 2011/0173164 A1 | 7/2011 | Bendel | |
| 2011/0196857 A1 | 8/2011 | Chen | |
| 2011/0213766 A1 | 9/2011 | Hong | |
| 2011/0282864 A1 | 11/2011 | Collins | |
| 2012/0296942 A1 | 11/2012 | Arora | |
| 2013/0006965 A1 | 1/2013 | Barbas | |
| 2013/0060547 A1 | 3/2013 | Beran et al. | |
| 2013/0117255 A1* | 5/2013 | Liu | G06F 16/2456 707/714 |
| 2013/0173528 A1 | 7/2013 | Betawadkar | |
| 2013/0198165 A1 | 8/2013 | Cheng | |
| 2013/0275364 A1 | 10/2013 | Wang | |
| 2013/0275365 A1* | 10/2013 | Wang | G06F 16/283 707/602 |
| 2013/0275367 A1 | 10/2013 | Shuma | |
| 2014/0052711 A1 | 2/2014 | Bamba et al. | |
| 2014/0067791 A1 | 3/2014 | Idcula | |
| 2014/0095534 A1 | 4/2014 | Aingaran | |
| 2014/0099502 A1 | 4/2014 | Ziauddin | |
| 2014/0101201 A1 | 4/2014 | Yan | |
| 2014/0172827 A1 | 6/2014 | Nos | |
| 2014/0181072 A1 | 6/2014 | Wong | |
| 2014/0214796 A1 | 7/2014 | Barber | |
| 2015/0088795 A1 | 3/2015 | Golovashkin et al. | |
| 2015/0088809 A1 | 3/2015 | Kociubes et al. | |
| 2015/0088856 A1 | 3/2015 | Hunter et al. | |
| 2015/0088885 A1 | 3/2015 | Hopernan, IV et al. | |
| 2015/0088919 A1 | 3/2015 | Hunter et al. | |
| 2015/0379299 A1 | 12/2015 | Klein | |
| 2016/0103880 A1 | 4/2016 | Attaluri | |
| 2016/0378833 A1 | 12/2016 | Chainani | |
| 2017/0024435 A1 | 1/2017 | Kociubes et al. | |
| 2017/0053010 A1 | 2/2017 | Beyer | |
| 2018/0859261 | 3/2018 | Li | |

OTHER PUBLICATIONS

Kociubes U.S. Appl. No. 14/806,576, filed Jul. 22, 2015, Interview Summary, dated Feb. 14, 2018.

U.S. Appl. No. 14/033,271, filed Sep. 20, 2013, Office Action, dated Jul. 21, 2015.

U.S. Appl. No. 14/033,271, filed Sep. 20, 2013, Interview Summary, dated Aug. 18, 2016.

U.S. Appl. No. 14/033,271, filed Sep. 20, 2013, Final Office Action, dated Mar. 15, 2016.

(56) References Cited

OTHER PUBLICATIONS

U.S. Appl. No. 14/033,251, filed Sep. 20, 2013, Office Action, dated May 27, 2016.
U.S. Appl. No. 14/033,251, filed Sep. 20, 2013, Interview Summary, dated Aug. 16, 2016.
U.S. Appl. No. 14/033,251, filed Sep. 20, 2013, Final Office Action, dated Dec. 21, 2015.
U.S. Appl. No. 14/033,251, filed Jul. 30, 2015, Office Action, dated Jul. 30, 2015.
U.S. Appl. No. 14/033,251, filed Jan. 22, 2016, Interview Summary, dated Jan. 22, 2016.
Kociubes, U.S. Appl. No. 14/033,271, filed Sep. 20, 2013, Notice of Allowance, dated Aug. 2, 2017.
Kociubes, U.S. Appl. No. 14/033,271, filed Sep. 20, 2013, Final Office Action, dated Apr. 12, 2017.
Hopeman, U.S. Appl. No. 14/033,251, filed Sep. 20, 2013, Notice of Allowance, dated Apr. 12, 2017.
Kociubes, U.S. Appl. No. 14/033,271, filed Sep. 20, 2013, Interview Summary, dated Jan. 30, 2017.
Hopeman IV, U.S. Appl. No. 14/033,251, filed Sep. 20, 2013, Interview Summary, dated Dec. 27, 2016.
Li, U.S. Appl. No. 15/713,365, filed Sep. 22, 2017, Notice of Allowance, dated Oct. 3, 2019.

\* cited by examiner

FIG. 1

Table 112:

| State | DGK |
|---|---|
| Massachusetts | 1 |
| California | 2 |
| Illinois | 3 |
| New York | 4 |
| Kentucky | 5 |

Table 102:

| Country | State | City | CID |
|---|---|---|---|
| USA | Massachusetts | Boston | 4 |
| USA | California | Los Angeles | 2 |
| USA | Illinois | Springfield | 6 |
| USA | Illinois | Chicago | 8 |
| Australia | Queensland | Springfield | |
| USA | California | Springfield | 6 |
| USA | New York | Albany | 1 |
| USA | New York | New York | 9 |
| USA | Kentucky | Springfield | 6 |

Table 101 (DGK):

| DGK |
|---|
| 1 |
| 2 |
| 3 |
| 3 |
| |
| 2 |
| 4 |
| 4 |
| 5 |

Table 123:

| Join Key | DGK Set | | |
|---|---|---|---|
| 6 | 3 | 4 | |
| ... | ... | ... | ... |
| 123a | 123b | 123c | |

Table 123:

| Join Key | DGK Set | | |
|---|---|---|---|
| 6 | 3 | 4 | 5 |
| ... | ... | ... | ... |
| 123a | 123b | 123c | 123d |

Columns 122a, 122b, 122c:

| position | | | |
|---|---|---|---|
| 0 | | | |
| 1 | | | |
| 2 | 2 | 2 | 4 |
| 3 | 1 | 1 | 2 |
| 4 | | | 1 |
| 5 | | | |
| 6 | 3 | 3 | MULTI-P |
| 7 | | | |
| 8 | | 3 | 3 |
| 9 | | | 4 |
| ... | | | ... |

130, 131

FIG. 3 dimension item DGK 314

| Item | DGK |
|---|---|
| Celery | 0xFFFF |
| Banana | 0 |
| Date | 0 |
| Farro | 1 |
| Eggplant | 0xFFFF |
| Apple | 0 |

Food table 302

| Category | Class | Item |
|---|---|---|
| Produce | Fruit | Apple |
| Produce | Fruit | Banana |
| Produce | Vegetable | Celery |
| Produce | Fruit | Date |
| Produce | Vegetable | Eggplant |
| Produce | Grain | Farro |

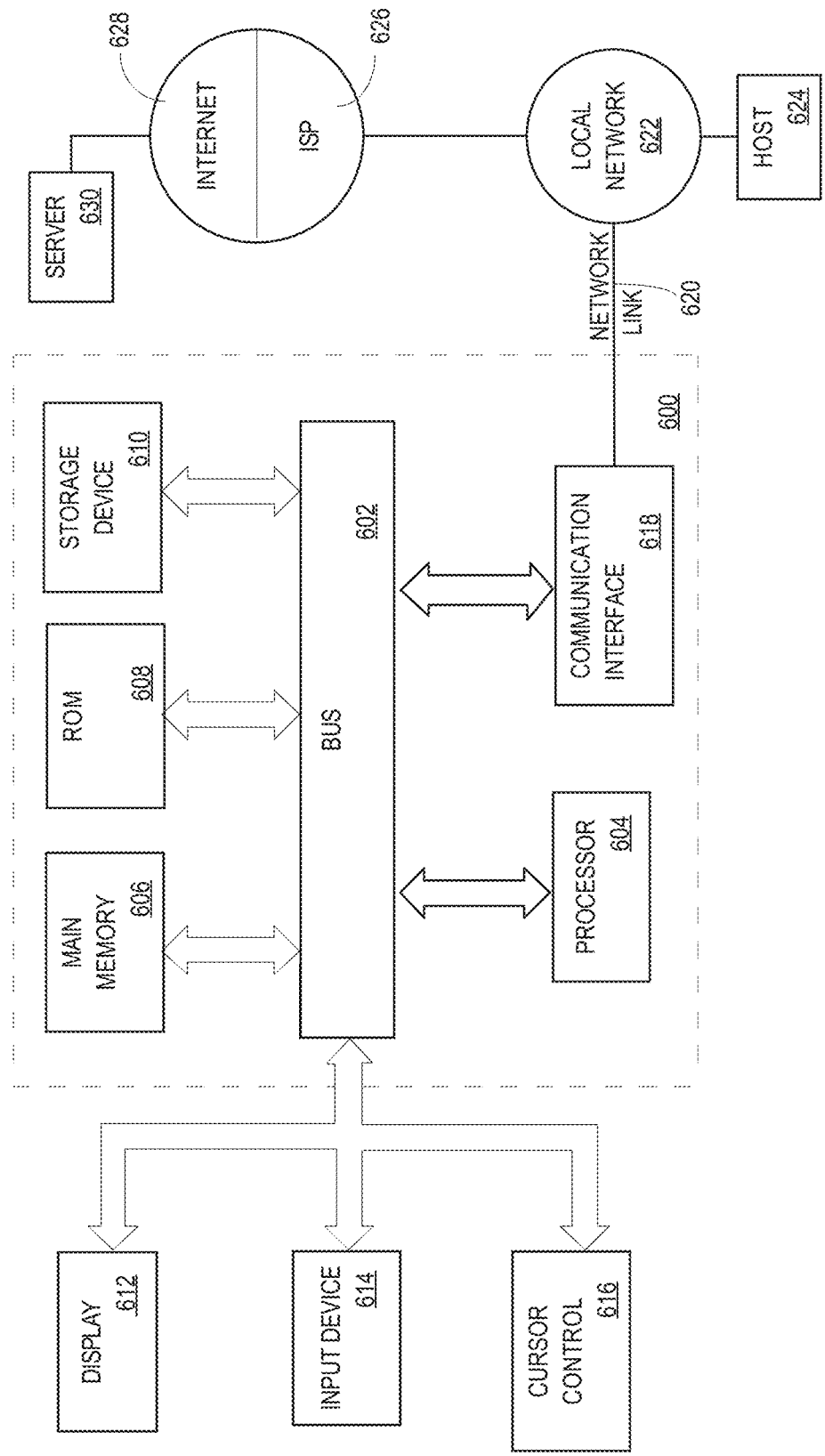

TECHNIQUES FOR DICTIONARY BASED JOIN AND AGGREGATION

TECHNICAL FIELD

The technical field relates to database management systems particularly to techniques for dictionary based join and aggregation.

BACKGROUND

Database management systems (DBMS's) are often designed to maintain large amounts of data. The amount of data stored is so large that the databases storing the information may colloquially be referred to as "data warehouses." Although the data stored in a data warehouse is large and describes a variety of entities, events, etc., the data items of the data may be very related.

To efficiently store large amounts of related data in a data warehouse, the DBMS may employ star/snowflake schema for the databases. The star/snowflake schema relates a set of factual data (sale transactions, quote requests) to analytic dimensions (customers, time, locations, merchandise types). Based on the schema the factual data is stored in "fact tables" that have one row per item, and the analytic dimensions are stored in "dimension tables," which describe multiple characteristics of items. Such a schema saves storage space in the data warehouse by eliminating repetition of the characteristics information common to multiple items for each of those items.

With time, as new facts are collected, factual data in a data warehouse tends to grow much faster than analytic dimension data, making fact tables generally much larger than dimension tables (having less rows than fact tables). The size and other data statistics as well as the database schema definition itself may be used by the DBMS to determine which tables are fact tables and which tables are dimension tables.

Dimension and fact tables are commonly joined by queries for business analysis. The combined data of the dimension and fact tables is aggregated to give the user a high level view of business performance. For example, sales might be aggregated by month and by the customer's home state.

Aggregation queries that are run against data that is organized in a star/snowflake schema typically specify a join key, an aggregate measure and a grouping key. The join key determines which row in a dimension table should be combined with a given row in the fact table, while the aggregate measure and grouping key determine which rows and columns are aggregated. For example, in
"select D.state, SUM (F.amount)
from F, D
where F.city_id=D.city_id
group by D.state" query, the "city_id" columns are join keys, the "amount" column is an aggregate measure and the "state" column is a grouping key.

The overall execution time is dominated by the processing of joins and aggregation. The query specifies that each row in fact table F should be joined with the row in dimension table D that has the same value for "city_id" as the fact table row. Further, once the rows from the fact table are joined to the appropriate rows in the dimension table, the rows should be divided into groups based on state, and the "amount" column values for each unique state are aggregated by summation.

One approach for executing such queries is to perform a hash join using hash tables. A "hash join" operation, generally speaking, comprises two phases. In the first phase, known as the "build phase," the DBMS generates a hash table by hashing each row of the first table according to a hash function on the join key column(s). In the second phase, known as the "probe phase," the DBMS then iteratively scans through each row of the second table. For each row in the second table, the DBMS uses the hash function and the hash table to identify rows in the first table with equivalent join key values. When matching rows are identified, the rows are merged and added to the result set for the join operation, assuming the rows also match any applicable join predicates. One technique for performing hash join operations is described in U.S. Pat. No. 8,825,678, issued Sep. 2, 2014, the contents of which are incorporated herein by reference.

For a large table, using hash tables to perform join and aggregation operations in this manner is inefficient as it requires a significant amount of memory for hashing numerous rows of large tables. Therefore, database systems that contain large amounts of information suffer significant performance degradation when performing join and aggregation operations using the hash join.

BRIEF DESCRIPTION OF THE DRAWINGS

In the drawings:

FIG. 1 is a block diagram that depicts a dense grouping key, a join-back table and a dense grouping key data structure, in an embodiment;

FIG. 3 is a block diagram that depicts a dimension table, a dense grouping key and a dense grouping key data structure created based on data from the dimension table, in an embodiment;

FIG. 6 is a block diagram illustrating a computer system that may be used to implement the techniques described herein.

DETAILED DESCRIPTION

Figure 2:
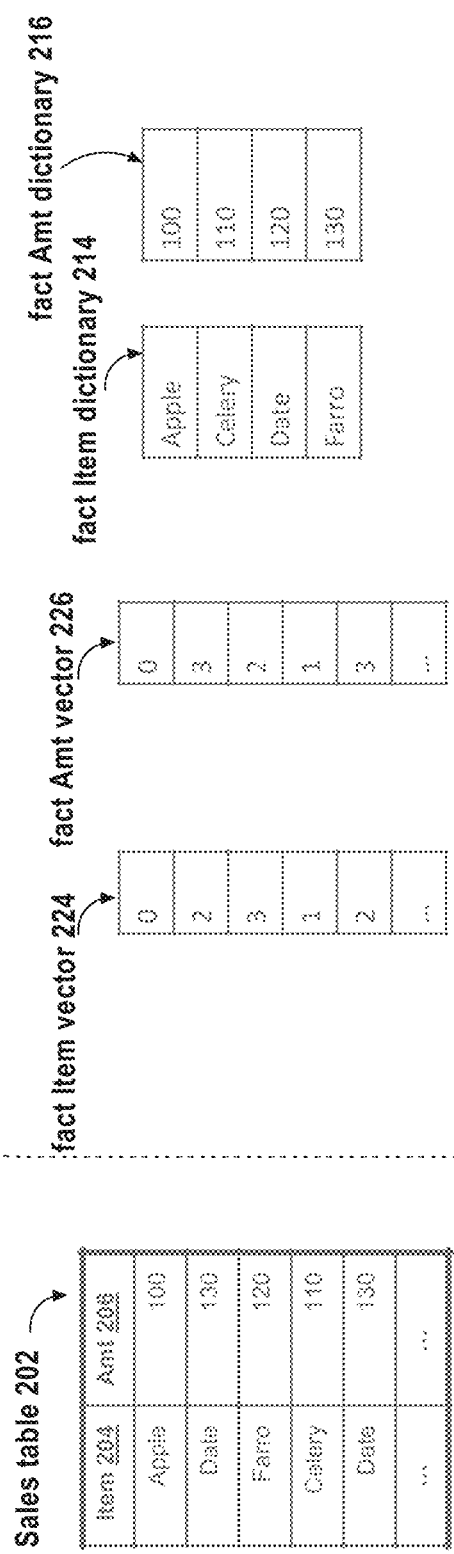
FIG. 2 is a block diagram that depicts a fact table and the corresponding data portion with column vectors and column dictionaries, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for efficiently processing of join and aggregation operations for fact and dimension tables leveraging column vectors and dictionaries for data. A DBMS performs in-depth pre-processing of dimension table rows to reduce processing of join and aggregation operations with fact table rows. Since dimension tables are smaller in size than fact tables, the DBMS can save computing resources by shifting the processing more to the dimension table side, for example by performing group/filtering operation first on the dimension table. "Dimension table," as referred herein, is a pre-defined data container managed by the DBMS or a data container based on joining one or more pre-defined data containers. Similarly, "fact table," as referred herein is a pre-defined data container managed by the DBMS or a data container based on joining one or more defined data containers, in which one or more attributes may be described in a corresponding dimension table. The DBMS may utilize the native column vectors and dictionaries for fact table rows to even further speed up the processing of the join and aggregation operations.

In an embodiment, for a dimension table of a received query, the DBMS generates a "dense grouping key (DGK)" data structure that represents a mapping between join key values and grouping key values of a dimension table. The term "dense grouping key (DGK)" refers to encoded representation of grouping key values, which are values of a group by column. In one embodiment, the DBMS generates DGKs as integers based on unique values in the group by columns. For example, "Massachusetts", "California", "Illinois", "New York", and "Kentucky" values in a group by column may be respectively assigned the DGKs of '1', '2', '3', '4' and '5' (as depicted in the FIG. 1 example). The use of dense grouping key values to represent grouping key values, rather than the grouping key values themselves, typically makes processing more efficient.

For a fact table in the received query, the DBMS may maintain one or more dictionary data structures for columns of one or more "data portions" of the fact table. The term "data portion" refers herein to a table, or a partition or a segment of a table, or any other portion of a database object. A data portion may contain a portion or a complete data from join key column and/or aggregate measure column specified in a received query. Each data portion may be stored in a different storage data unit, a unit of storage in volatile or persistent storage that has a predetermined size. The data portion may be stored in a storage data unit in a row major format (cell elements of each row are stored in contiguous memory addresses) or a column major format (cell elements of each column are stored in contiguous memory addresses). The data in the data portion may also be compressed using a compression with a particular level of compression.

The term "column dictionary" is used to describe a dictionary data structure for a column vector in a data portion; the dictionary data structure maps dictionary encoded values in the data portion to the unique values of the column. In an embodiment, a column dictionary contains unique values of a join key column in the data portion, while a column vector of the data portion contains encoded join key values that are indices of the corresponding dictionary. Stated differently, each cell element of the join key vector of the data portion is a pointer to an entry in the corresponding column dictionary that contains the actual value of the corresponding cell of the join key column. For example, such pointer within a cell element may be an index into a vector of fixed width pointers or offsets that can be used to locate column dictionary values in the column dictionary.

When processing a query, the DBMS may access DGKs generated for a dimension table to map the DGKs with join key values of the fact table using fact table column dictionaries. In an embodiment, the DBMS iterates through a fact table column dictionary of the join key column (for example, 214 of FIGS. 2 and 5) and matches the join key values with the corresponding join key values of the dimension DGK data structure (for example, 314 of FIGS. 3 and 5). By doing so, regardless whether any column in the dimension table is referenced in the GROUP BY clause of the query, the DBMS effectively filters the values of fact table to be further processed. Only those rows of the fact table are to be processed which correspond to the fact dictionary join key values that have matched with the dimension join key values in the DGK data structure. Thus, the DBMS performs exact filtering of fact table rows based on the DGK data structure as opposed to other approximate filtering techniques used in query computation such as Bloom filters.

The exact nature of this DGK based filtering allows aggregation to be pushed before the traditional join since the exact set of rows that may need to be aggregated can be determined by the DBMS ahead of the aggregation. Using this filtering based on the matched join key values, the DBMS creates a DGK-mapped data structure (for example, 514 of FIG. 5) similar to the dimension join key column dictionary that maps encoded dimension join key values to the DGKs (for example, 314 of FIGS. 3 and 5), and maps encoded join key values common to the dimension and fact join keys to DGKs (for example, 514 of FIG. 5). Since the index of the generated mapping data structure is similarly based on encoded join key values, the DBMS may easily access the corresponding DGK for each join key element of a fact table data portion. Based on such an access, aggregate measure values, of one or more aggregate key columns, corresponding to the join key cells are then aggregated for each unique DGK to yield the result for the one or more aggregate functions of the received query.

Dense Grouping Keys

FIG. 1 illustrates an example of dense grouping key values (DGKs) 101 and data structures 112, 122A-C, 123A-C based on dense grouping key values that may be created from data of a dimension table. For the purpose of illustrating a clear example, dimension table 102 is used in illustrating the example of creating dense grouping key data structure and "join back table" based on data of a dimension table.

Queries that specify aggregation operations identify one or more group-by column(s). The DBMS creates a dense grouping key value for each unique combination of values, from those group-by columns, that appears in any row of the table. A unique combination of values, from those group-by columns, that appears in any row of the table, is referred to herein as a "grouping key value".

In an embodiment, dense grouping key values are a sequence of consecutive numbers and all dense grouping key values have a fixed size. For example, if dense grouping key values are a series of integer values, then each dense grouping key value will be the size of an integer data type. Multiple rows of a dimension table may be represented or indicated by a single dense grouping key value.

Join Back Table

As used herein, the term "join back table" refers to a data structure that comprises one or more dense grouping key values and corresponding grouping key value or set of grouping key values. In an embodiment, the join back table comprises columns for dense grouping key values and corresponding grouping key values. In an embodiment, each entry of the join back table comprises a different dense grouping key value and the corresponding grouping key value or set of grouping key values.

In an embodiment, the join back table is a temporary table that is created only for a query and is discarded after the query is successfully processed.

Creation of Dense Grouping Key Values and Join Back Table

Dense grouping key values may be created based on the DBMS receiving a query such as:

---
Query Q1.

SELECT g.state, sum (s.amount)
FROM sales s, geog g
WHERE g.CID = s.CID AND g.country = 'USA'
GROUP BY g.state
---

The DBMS may identify the one or more columns indicated by the GROUP BY criteria specified in a query as the column or columns relevant for computing the aggregation operation. The DBMS, may then determine the dense grouping key values for the relevant column or columns and also determine the number of dense grouping key values and for each dense grouping key value, the corresponding value or values in the one or more columns indicated by the GROUP BY criteria.

In query Q1, table "sales" is a fact table and "geog" is a dimension table. For the purposes of illustrating a clear example, table "geog" is dimension table 102 represented in FIG. 1.

In an embodiment, the DBMS identifies one of the tables specified in a query to be a fact table based on certain metrics associated or corresponding to the tables. For example, if a DBMS determines that the size of one of the tables is substantially larger than other tables, then the DBMS identifies the large table as a fact table, and identifies the smaller tables as dimension tables.

The DBMS may determine and create dense grouping key values for the relevant column or columns, and the join back table used in grouping dimensional data and/or aggregating dimensional data, by executing the following example query:

---
Query Q2.

CREATE TEMPORARY TABLE tt_geog as
SELECT g.state, keyvec_create(g.state ) dgk
FROM geog g
WHERE g.country = 'USA'
GROUP BY g.state
---

Query Q2 represents an example query that may be executed for each dimension table specified in the GROUP BY clause of query Q1 or in the WHERE clause of query Q1.

The DBMS by executing the keyvec_create( ) function of query Q2 creates a dense grouping key value for each unique value of the group key column specified by the GROUP BY clause. Thus a unique dense grouping key value is created for each unique grouping key value of the "state" column of dimension table 102.

Dense grouping key values are created for only the rows with values of a dimension table that are actually used in determining a result set. Therefore, the rows represented by dense grouping key values are rows with values that satisfy a filtering criteria in a predicate of the query. Thus, the number of rows represented by a dense grouping key value are reduced from all possible rows of the dimension table to only those rows of the dimension table that are actually used.

Therefore, prior to creating a dense grouping key value for a particular grouping key value, query Q2 also ensures that filtering criteria of query Q2 is satisfied by the row of the particular grouping key value. The filtering criteria of query Q2 is specified by the WHERE clause and it requires that the value in the "country" column of the dimension table 102 is 'USA'. Consequently, dense grouping key values are created only for unique group-by values from rows that have a value of 'USA' in the country column of dimension table 102.

For example, in FIG. 1, dimension table 102 includes 'Massachusetts' in the "State" column of row one, and query Q2, prior to creating a dense grouping key value for 'Massachusetts', determines whether "Country" value associated with 'Massachusetts' is indeed 'USA', thus satisfying the filtering criteria. In dimension table 102, the "Country" value associated with 'Massachusetts' is indeed 'USA', therefore a dense grouping key value is created for 'Massachusetts'. However, for 'Queensland', a dense grouping key value is not created because the "Country" value associated with 'Queensland' is 'Australia', thus the row of grouping key value 'Queensland' does not have a value of 'USA' in the "country" column of dimension table 102, thereby failing the filtering criteria.

In the example of query Q2 the temporary table tt_geog is the join back table. In FIG. 1 data structure 112 is the join back table. Join back table 112 comprises a column of dense grouping key values, indicated by column name "DGK", and a column of grouping key values, indicated by "State". Each entry of join back table 112 comprises a different dense grouping key (DGK) value and the corresponding grouping key value. In an embodiment, DGK values are assigned sequentially in the order of scanning the grouping key values by the DBMS from the table. For example, the "Massachusetts" grouping key value in Table 102 is the first value scanned for the "State" grouping key column and thus, is assigned to the DGK value of 1.

The DBMS by executing the keyvec_create( ) function of query Q2 also associates each dense grouping key value within the join back table 112 with a row in the dimension table 102 based on that dense grouping key value's corresponding grouping key value. The DBMS may create a data structure such as array 101 to store the associations between each row of the dimension table and a dense grouping key value. Each row of the dimension table is an index into the array. Array 101 starts from zero index, therefore, the first row of dimension table corresponds to the first position of the array as depicted in FIG. 1.

In FIG. 1, since the corresponding dimension table 102 value of dense grouping key value '1' is 'Massachusetts' in join back table 112, each row of dimension table 102 with 'Massachusetts' as the "State" column value will be associated with the dense grouping key value of '1', as indicated by the first position of the array 101. The corresponding dimension table 102 value of dense grouping key value '2' is 'California' in join back table 112, thus rows two and six of dimension table 102 are associated with dense grouping key value '2', as indicated by positions two and six of array 101.

The corresponding dimension table 102 values of dense grouping key values '3', '4', '5', are Illinois, New York, and Kentucky, respectively, in join back table 112. Therefore, rows seven and eight of dimension table 102 are associated with dense grouping key value '4', rows three and four of dimension table 102 are associated with dense grouping key value '3', and row nine of dimension table 102 is associated with dense grouping key value '5'. These associations are represented in array 101 by positions seven and eight for dense grouping key value '4', positions three and four for dense grouping key value '3', and position nine for dense grouping key value '5'.

In an embodiment, the DBMS may create a temporary dimension table with an additional column, where each row in the additional column comprises a dense grouping key value associated with that row of the dimension table.

In another embodiment, without generating array 101, the DBMS may directly proceed to generating a DGK data structure where different entries of the data structure correspond to unique join key values and a dense grouping key value corresponding to each of the unique join key values. While computing the query, the DBMS may use the resulting rows of the dimension table from one or more predicate evaluations to produce a list of unique join key values for those rows and the associated grouping key values of those rows.

The DBMS may generate a DGK data structure by executing the query referenced keyvec_create( ) function. The join key values used in creating the data structure are specified by the join key column of the WHERE clause of query Q1. The dimension table join key column specified in query Q1 is the "CID" column of "geog" dimension table 102 depicted in FIG. 1.

The DGK data structure created is depicted by data structures, 122a, 122b, 122c in FIG. 1. Data structures 122a, 122b, 122c are the same data structure depicted at different points in time. In an embodiment, if join key values are numeric or if a numeric value can be associated with a non-numeric join key value, then the DGK data structure created by the DBMS may be a vector. Use of a vector to store a dense grouping key value for the corresponding join key value may allow the DBMS to benefit from the fast read and write operations that can be performed on a vector data structure.

In query Q1, the values of the specified join key column are numeric. Therefore, in FIG. 1, the DGK data structure created is a vector depicted by DGK data structures 122a, 122b, 122c. DGK data structures 122a, 122b, 122c are the same vector depicted at different points in time. The size of the data structure is based on the number of join key values. If a filtering criteria is specified, then only rows of the dimension table that satisfy the filtering criteria will be considered for the DGK data structure. For example, query Q2 specifies a filtering criteria that requires the value in the "Country" column of a row in the dimension "geog" table to comprise 'USA'. Therefore, only join key values of rows in the dimension "geog" that satisfy the filtering criteria will be considered for the DGK data structure represented by DGK data structures 122a, 122b, 122c. Based on the data of dimension table 102, all rows except for the row where the "Country" value is 'Australia' will be considered for the DGK data structure represented by DGK data structures 122a, 122b, 122c.

Each join key value of "CID" column in dimension table 102 is an identifier for a unique value in the City column of dimension table 102. Therefore, each value in the City column of dimension table 102 has a corresponding value in the "CID" column in dimension table 102. For example, 'Boston' has corresponding "CID" value of '4', and similarly 'Springfield' has a "CID" value of '6'.

In FIG. 1, the numeric values of join key column "CID" may be used as index into the vector, represented by DGK data structures 122a, 122b, 122c, for storing the corresponding dense grouping key value of the join key value. For example, the first row of join key column "CID" of dimension table 102 has a numerical value of '4'. Thus, the dense grouping key value associated with the first row of dimension table 102 will be stored in the fourth position of the vector, as depicted in DGK data structures 122a, 122b, 122c. In some embodiments, the size of the vector may be based on the maximum value among the values of the join key column. In FIG. 1, DGK data structures 122a, 122b, 122c are vectors of size 10. In an embodiment, the size of the vector may be based on the maximum value among the values of the join key column whose rows also satisfy a filtering criteria if specified.

Using the numerical values of the join key column, each row satisfying the filtering criteria specified in query Q2 is processed, and the dense grouping key value associated with the processed row is stored in DGK data structure 122a at the location indicated by the numerical value of the join key column. For example, in FIG. 1, as described above, at the fourth position of DGK data structure 122a, the dense grouping key value associated with first row of dimension table 102, dense grouping key value of '1' will be stored. Similarly, at the second position of DGK data structure 122a, the dense grouping key value '4' is stored.

Join key values of the join key column of a dimension table may not provide a unique constraint on the dimension table: one join key value may correspond to multiple grouping key values. For such a many-to-many join key-to-dense grouping key value relationship, multiple dense grouping key values in the vector corresponding to a same join key value occurring more than once within the join key column, are replaced with a flag value that indicates that a hash table associated with the vector should be used in performing join and aggregation operations as part of the DGK data structure. The vector flag value referenced row in the hash table contains the multiple dense grouping key values, in an embodiment.

For example, the "CID" value of '6' in dimension table 102 is associated with more than one dense grouping key value. Therefore, the first time the "CID" value of '6' is processed (the third row of dimension table 102), at the sixth position of DGK data structure 122b, the corresponding dense grouping key value for the third row of dimension table 102 is stored. The second time the "CID" value of '6' is processed, that is when the sixth row of the "CID" column of dimension table 102 is processed, the dense grouping key value at the sixth position of DGK data structure 122b is changed to a flag value as depicted in DGK data structure 122c. Additionally, a hash table is created that includes the join key value that is associated with more than one dense grouping key value and each of the corresponding dense grouping key values of the join key value as a DGK set.

In FIG. 1, processes 130 and 131 depict the creation of hash table 123 where join key value of '6', depicted in first row of column 123a, is associated with a list of DGK sets, 123b, 123c comprising corresponding dense grouping key values 3 and 4 respectively. The third time the "CID" value of '6' is processed, that is when the ninth row of the "CID" column of the "geog" dimension table 102 is processed, the dense grouping key value at the sixth position of DGK data structure 122c still remains the flag value and an additional DGK set 123d with a value of 5, is added to the list of DGK sets in the hash table for join key value '6'.

DGK data structure 122c illustrates how the vector comprising dense grouping key values looks after all join key values that will actually be used in determining the result set of a query are processed. DGK data structure 122c also illustrates an example of a DGK data structure that can support processing many-to-many relation data.

In an embodiment, the DBMS receives a query in which one or more join key columns are string based rather than integer based. In such an embodiment, rather than using a vector in which an entry may be accessed by an integer, a DGK data structure may be used in which an entry may be accessed by a string, such as a hash table. In a related embodiment, for a grouping key of a short string or date data type, the DBMS uses the raw byte value of a grouping key value as an integer DGK value and/or applies a function to convert the grouping key value to an integer DGK value.

For example, the DBMS may receive a query such as recited below, in which the join key columns, "item", are a string value based columns. The DBMS may convert the string values of the "item" column to an integer for streamlining the processing of query Q3, however, FIG. 2 and FIG. 3 depict the "item" values as a string for ease of readability:

Query Q3.

SELECT f.class, sum(s.amt)
FROM sales s, food f
WHERE s.item = f.item AND f.class != 'Vegetable'
GROUP BY f.class FIG. 2 depicts "Sales" table 202, which is the fact table of query Q3 comprising the "item" 204 and "amt" 206 columns. The "amt" column is the aggregate measure column referenced in the "SUM" aggregation function of query Q3. The "item" column is the join key column is joined in query Q3 with the "item" column of "Food" table 302 depicted in FIG. 3. The "Food" table 302 also contains the "class" column that is the grouping key column of query Q3.

The "item" join key columns have string based values. Accordingly, the generated dimension "Item" DGK data structure 314 has a string based index corresponding to the unique string values of the "item" column in "Food" dimension table 302. Dimension "Item" DGK data structure 314 maps the unique string join key values of the "item" column to dense grouping key values generated from the grouping key values of the "Class" column. To perform the join operation of query Q3, Item DGK data structure may be compared to dictionaries of join key values of fact "Sales" table 202 data portions stored in storage data units.

Column Dictionaries

In an embodiment, one or more data portions store dictionary encoded values of actual values of a database object in data portion's cell elements. Each cell element corresponds to a particular row and a particular column of the database object, such as a fact table. The cell elements may be arranged as a column vector that mimics the particular column arrangement within the database object. When multiple column vectors are stored in a data storage unit, the column vectors can be stored in a column major or a row major format.

Furthermore, the DBMS may maintain a column dictionary for each column vector that column vector's dictionary encoded values to the corresponding values in the database object. Such column dictionaries for a data portion contain at least all unique database object values for data represented in the data portion for the corresponding columns of the database object.

Similar to DGK data structure, column dictionaries may arrange the mapping in many different ways using various hash based and non-hash based dictionary encodings. In an embodiment, dictionary encoded value in a cell element is an index to an entry in a column dictionary that contains the corresponding database object value. Thus, the corresponding database object value can be retrieved from the column dictionary by specifying the dictionary encoded value as an index to the column dictionary.

FIG. 2 depicts examples of a data portion that includes a dictionary structure for a database object, in an embodiment. Database object "Sales" table 202 contains two columns: "Item" column 204 and "Amount" column 206. Since "Item" column 204 contains four different values: "Apple", "Celery", "Date" and "Farro", fact column dictionary 214 contains four values in a zero based index vector. Instead of data portion 222 storing the actual values from "Item" column 204, fact "Item" column vector 224 of data portion 222 stores in its cell elements the dictionary encoded indices of fact column dictionary 214 that correspond to the actual values at "Item" column 204 for a particular row. For example, the first row of "Item" column 204 contains the value of "Apple." Based on fact column dictionary 214, the "Apple" value is at the zero index. Accordingly, fact "Item" column vector 224 stores zero at the first row. Similarly, the "Date" value at the second row of "Item" column in "Sales" table 202, corresponds to index two in fact column dictionary 214. Thus, the index value of two is stored at the second row of fact "Item" column vector 224. The rest of "Item" column 204 and "Sales" column 206 are stored similarly in fact column vectors 224 and 226 using fact dictionaries 214 and 216, respectively.

In an embodiment, dictionary encoded values in a column vector are based on memory addresses of entries in a corresponding column dictionary. The column dictionary may store unique actual values of a column in a contiguous memory space, each entry of a unique actual value being at a particular offset from the first entry's memory address. These offsets are equivalent to indices of the column dictionary, and cell elements of the column vector may store the offsets of the corresponding unique actual value as dictionary encoded values. According to such an arrangement, a look up of an actual value is performed by request for a value at a particular offset from the first entry memory address.

In an embodiment, a data portion containing column vectors and dictionaries, is generated as part of Ozip compression of a database object using techniques described in U.S. patent application Ser. No. 14/337,113, filed Jul. 21, 2014, the contents of which are incorporated herein by this reference. According to such techniques, a packed sequential plurality tokens are generated from the input database object data and a static dictionary data structure, such as a column dictionary, is used to decode the tokens into actual values of the input database object data.

In an embodiment, data portions are generated in response to a receipt and processing of a query. Continuing with the example of the DBMS processing query Q3, the DBMS determines that "food" table of Q3 is a dimension table for the "sales" fact table. Accordingly, to execute query Q3, the DBMS generates dimension DGK data structure 314 from "Food" dimension table 302 as depicted in FIG. 3 using the techniques described above. The DBMS may additionally generate column vectors with dictionary encoded values for "sales" and "food" tables and column dictionaries to decode the encoded values into actual values, as depicted in FIGS. 2 and 3, respectively. Once generated, data portions may be stored in a volatile and/or persistent memory managed by the DBMS. Thus, next time a query referencing the same table is received, the data portions may not need to be regenerated but rather the already existing data portions are used.

In another embodiment, data portions are generated independent of a query receipt by the DBMS. Data portions may be generated when database objects that are stored persistently in the persistent data format, are mirrored into volatile memory in a mirror format as described in U.S. patent application Ser. No. 14/337,179, filed Jul. 21, 2014, the contents of which are incorporated herein by this reference. In a related embodiment, a data portion may be maintained as an IMCU and one or more column dictionaries for the data portions may be stored as the metadata of the IMCU. Accordingly, once IMCUs are generated as the MF data of a database object, the DBMS may use the IMCUs that include column dictionaries to perform join and/or aggregation operations.

Joining and Aggregating Fact and Dimension Tables

The DBMS may perform join and aggregation operation of a received query using DGK data structures and data portions that include column vectors and column dictionaries of the fact and dimension tables of the target data set of the query. In an embodiment, rather than performing the join and aggregation operations of a query after scanning the target data set, the DBMS performs the join and aggregation operations while scanning the target data set. The joining and aggregating during the scan significantly reduces the resource utilization of the DBMS, especially when column vectors and column dictionaries, have been pre-generated before the scan as is the case for IMCUs.

Figure 4A:
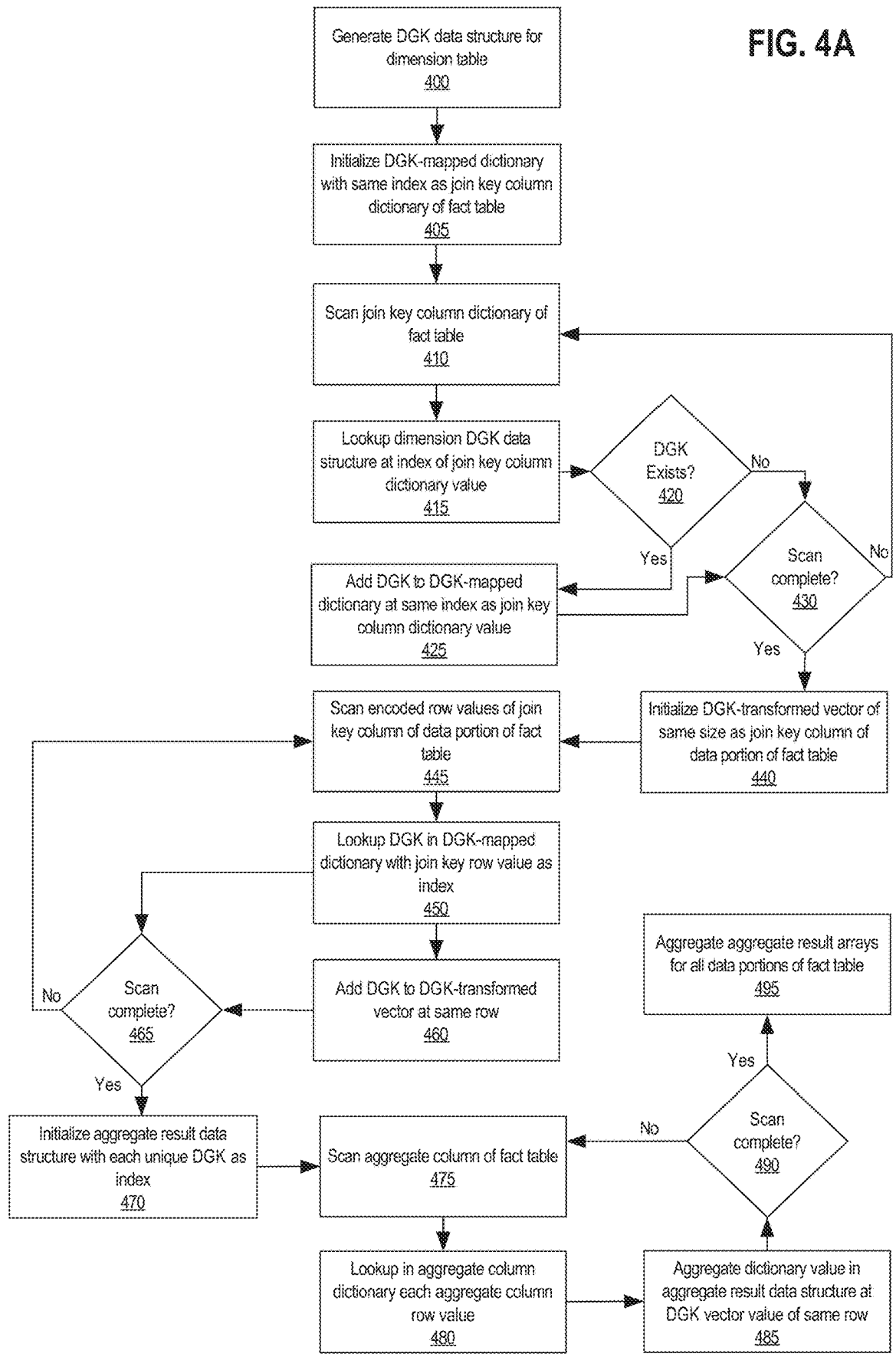
FIGS. 4A and B are flow diagrams that depict processes for performing join and aggregation operations using column vectors and dictionaries, in one or more embodiments.

FIG. 4A is a flow diagram that depicts a process for performing join and aggregation operations, in an embodiment. Using the techniques described for generating a DGK data structure, at block 400, the DBMS generates a DGK data structure for a dimension table of the target set of a received query. For example, FIG. 3 depicts dimension "Item" DGK data structure 314 for the "Item" column of "Food" dimension table 302. Dimension "Item" DGK data structure 314 may have been generated in response to the DBMS receiving query Q3, which references "Food" dimension table 302.

To perform a join operation between a dimension table and a fact table, data structures of the fact table and the dimension table may need to be on a same compute node of the DBMS. In an embodiment in which a DGK data structure is stored on a different compute node than data portions of the fact table, a copy of the DGK data structure may be transferred to the compute nodes that store data portions for evaluation of the query.

In an embodiment, the join operation is performed by comparing the DGK data structure of a dimension table with column dictionaries of a fact table data portion. To do so, a new dictionary-grouping key mapping is generated that maps each join key value in the fact table portion to the dense grouping key for which the associated dimension join key value matches the join key value from the fact table data portion. A DGK-mapped dictionary data structure may be initialized at block 405 to store the dictionary-grouping key mapping. The new DGK-mapped dictionary has the same index as the join key column dictionary of the fact table data portion and maps join key values of the fact table rather than the dimension table with DGKs of the dimension table. Such a mapping effectively performs a join operation between join key columns of the dimension table and the fact table while preserving the association with the DGKs. Alternatively or additionally, the new DGK-mapped dictionary data structure may be dynamically allocated as new entries for the mapping dictionary data structure are determined and populated in the new data structure by the process.

To generate a dictionary-grouping key mapping for the new DGK-mapped dictionary, at block 410, a join key column dictionary of a fact table data portion is scanned. Each retrieved join key value is used for an index to look up into the DGK data structure at block 415. If an entry in the DGK data structure at the index exists, at block 420, the DGK for the matched dictionary entry is added to the new DGK-mapped dictionary at the same index as the retrieved join key value at block 425. If an entry does not exist, no dictionary-grouping key mapping exists for the fact join key value and no entry may be added to the DGK-mapped dictionary. In another embodiment, a special null value is added to the DGK-mapped dictionary to indicate that the join key value for the fact table does not exist in the dimension table. The process repeats blocks 415 through 425 until the join key column dictionary is fully scanned at block 430.

Figure 5:
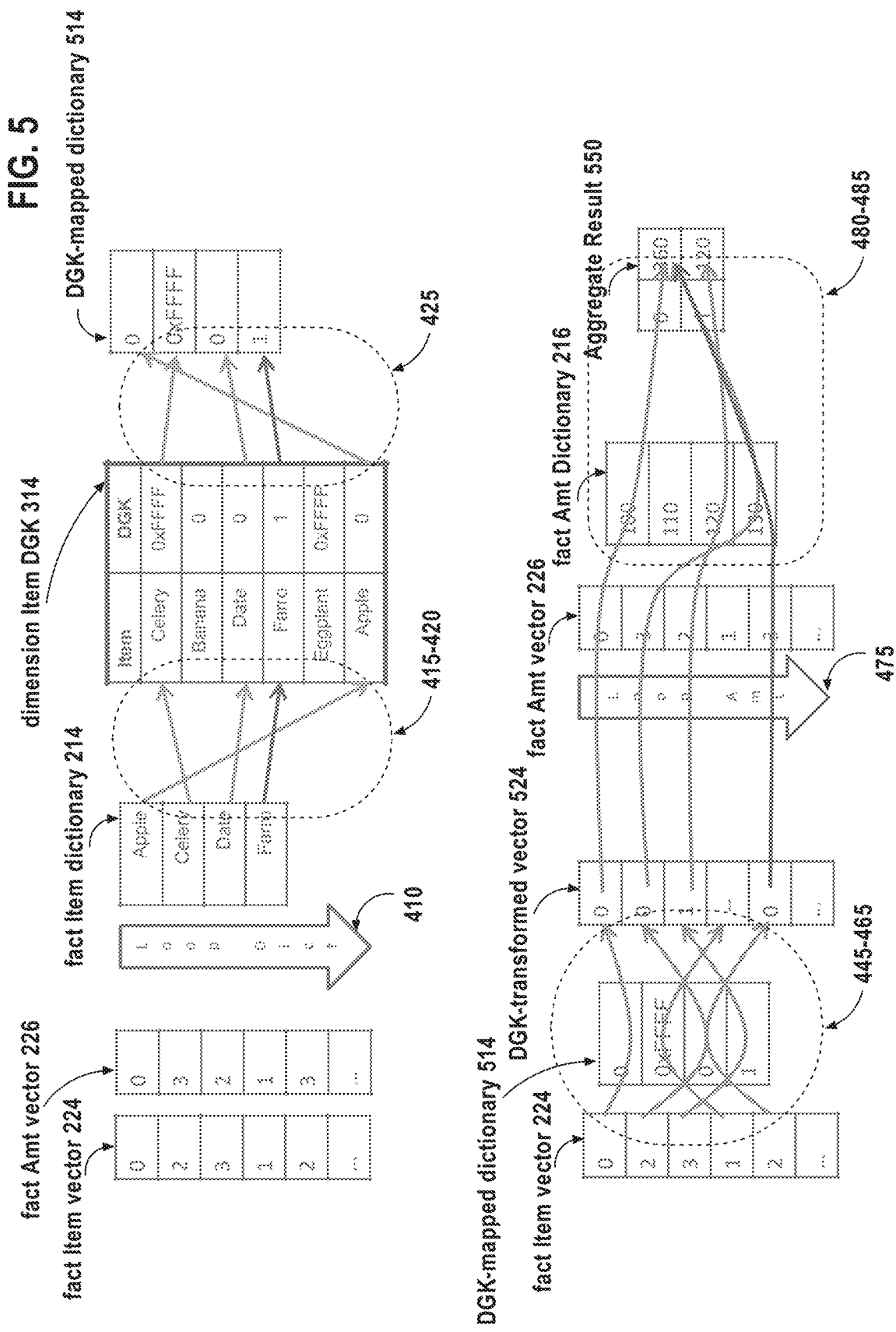
FIG. 5 is a process diagram that depicts process for performing join and aggregation operations on example data structures of fact and dimension tables referenced in a query, in an embodiment.

For example, FIG. 5 depicts dimension "Item" DGK data structure 314 and fact "Item" dictionary 214 that are used for generating dictionary-grouping key mapping in DGK-mapped dictionary 514 as part of the execution of query Q3. Fact "Item" dictionary 214 as well as fact "Item" column vector 224 and "Amt" column vector 226 are also depicted in FIG. 2 and are part of data portion 222 of "Sales" fact table referenced in query Q3.

DGK-mapped dictionary 514 is initialized with the same indexes as fact "Item" column dictionary 214: for example, the first entry has the index of '0' which, like fact "Item" column dictionary 214's index '0', corresponds to the encoded value of '0' in fact "Item" column vector 224. Each entry in fact "Item" dictionary 214 is retrieved and compared with dimension "Item" DGK data structure 314 as described at blocks 415-420 of FIG. 4. For example, the first entry value of "Item" column dictionary, 'Apple', is looked up in dimension "Item" DGK data structure 314. The lookup matches the 'Apple' value with the last index of dimension DGK data structure 314 that contains the value of '0' for the DGK of that entry and retrieves this DGK value. As described at block 425 of FIG. 4, the process adds the retrieved DGK value at the same index in DGK-mapped dictionary 514 as the original look up value in fact "Item" dictionary 214. For the join key value of 'Apple', that index is 0 (the first entry), and thus, the DGK value of '0' is added to the first entry at index 0 of DGK-mapped dictionary 514. The DBMS similarly generates the rest of the mapping and populates the rest of the entries in DGK-mapped dictionary 514 as depicted in FIG. 5.

In an embodiment, at block 440, the process may initialize a DGK-transformed vector of the same size as the join key vector of the data portion. Alternatively or additionally, the new DGK-transformed vector may be dynamically allocated as new mappings are added as a result of join key value scan. The DGK-transformed vector expands the mapping information between a fact table join key value and a DGK by storing a DGK for each row of the data portion. At block 445, the encoded join key values of the fact table column vector are scanned. Each retrieved encoded join key value is used as an index to look up a corresponding DGK in the dictionary-grouping key mapping at block 450. At block 460, the corresponding DGK is added to the DGK-transformed vector at the same row as the retrieved encoded join key value that was used to look up the DGK. Once the scan is complete at block 465, the DGK-transformed vector contains DGK values for each row of the fact table data portion.

In an embodiment, to evaluate an aggregate function on an aggregate measure column of the fact table, the aggregate measure values are aggregated based on DGKs of same rows. In particular, at block 470, an aggregate result data structure may be initialized with indexes corresponding to the unique values of DGKs. In another embodiment, the aggregate result data structure is dynamically expanded when a new unique DGK value is encountered. At block 475, the process scans rows of the aggregate measure vector and, at block 480, looks up the aggregate measure value in the aggregate measure dictionary based on the row value of the aggregate measure vector. Based on the DGK value at the same row, the process retrieves the previous aggregate result from the aggregate result data structure and aggregates the previous aggregate result with the looked up aggregate measure value at block 485 to yield the new aggregate result for the DGK. At the end of the scan at block 490, the aggregate result data structure contains aggregate results for each DGK for the data portion.

In an embodiment, in which multiple data portions contain the data of the fact table, multiple aggregate result dictionaries are generated for the query execution. The results from the multiple aggregate result dictionaries are further aggregated per each common DGK, to yield the final aggregate result for the query at block 495.

In an embodiment, final aggregate results per DGKs are converted through join back table of the DGKs to grouping key values. Thus, the DBMS may return the final aggregate result with the corresponding grouping key value.

Continuing with the example of query Q3 execution referencing "Sales" table 202 and "Food" table 302, the DBMS uses generated DGK-mapped dictionary 514 to aggregate measure values based on DGKs. In particular, DGK-mapped dictionary 514 is expanded to have a corresponding DGK for each encoded row value of fact "Item" column vector 224. To do so, each encoded join key value of fact "Item" column vector 224 is used as an index into DGK-mapped dictionary 514 to look up the corresponding DGK. For example, the last row of fact "Item" column vector 224 has the value of '2'. DGK-mapped dictionary at the index value of '2', contains DGK value '0'. Accordingly, DGK value of '0' is added as the last row of DGK-transformed vector 524.

Based on generated DGK-transformed vector 524, encoded aggregate measure values of fact "Amt" column vector 226 are mapped to DGKs of same rows. Based on this mapping, aggregate measure values in fact "Amt" column dictionary 216 can be aggregated per each unique DGK. In particular, for each row in "Amt" column vector, the encoded row value is used to look up the actual "Amt" column value in fact "Amt" column dictionary 216. The looked up value corresponds to the same row DGK value in DGK-transformed vector 524, and can be aggregated for the DGK value in aggregate results 550. For example, the scan of the first row of "Amt" column vector yields value of '0', which corresponds to the value of '100' at the index of '0' in fact "Amt" dictionary 216. The first row in DGK-transformed vector 524 has the DGK of 0, and since query Q3 specifies SUM aggregate function, the "Amt" value of '100' is summed with an initial value for the DGK value of '0'. The scan of the second row in fact "Amt" column vector 226 yields the value of '3', which corresponds to the value of '130' at the index of '3' in fact "Amt" dictionary 216. The second row of DGK-transformed vector 524 has the same DGK value of '0' and thus, the retrieved "Amt" value of '130' is summed with the previous aggregate result of '100' at DGK index value of '0' in aggregate result data structure 550. After all values in fact "Amt" column vector 226 are scanned and processed according to blocks 480-485 of FIG. 4, aggregate result data structure 550 contains the aggregate results for query Q3 for data portion 222. Since DGK values are common across data portions of fact table, the final result for each DGK may be obtained by aggregating the results of the data portion per each DGK.

Figure 4B:
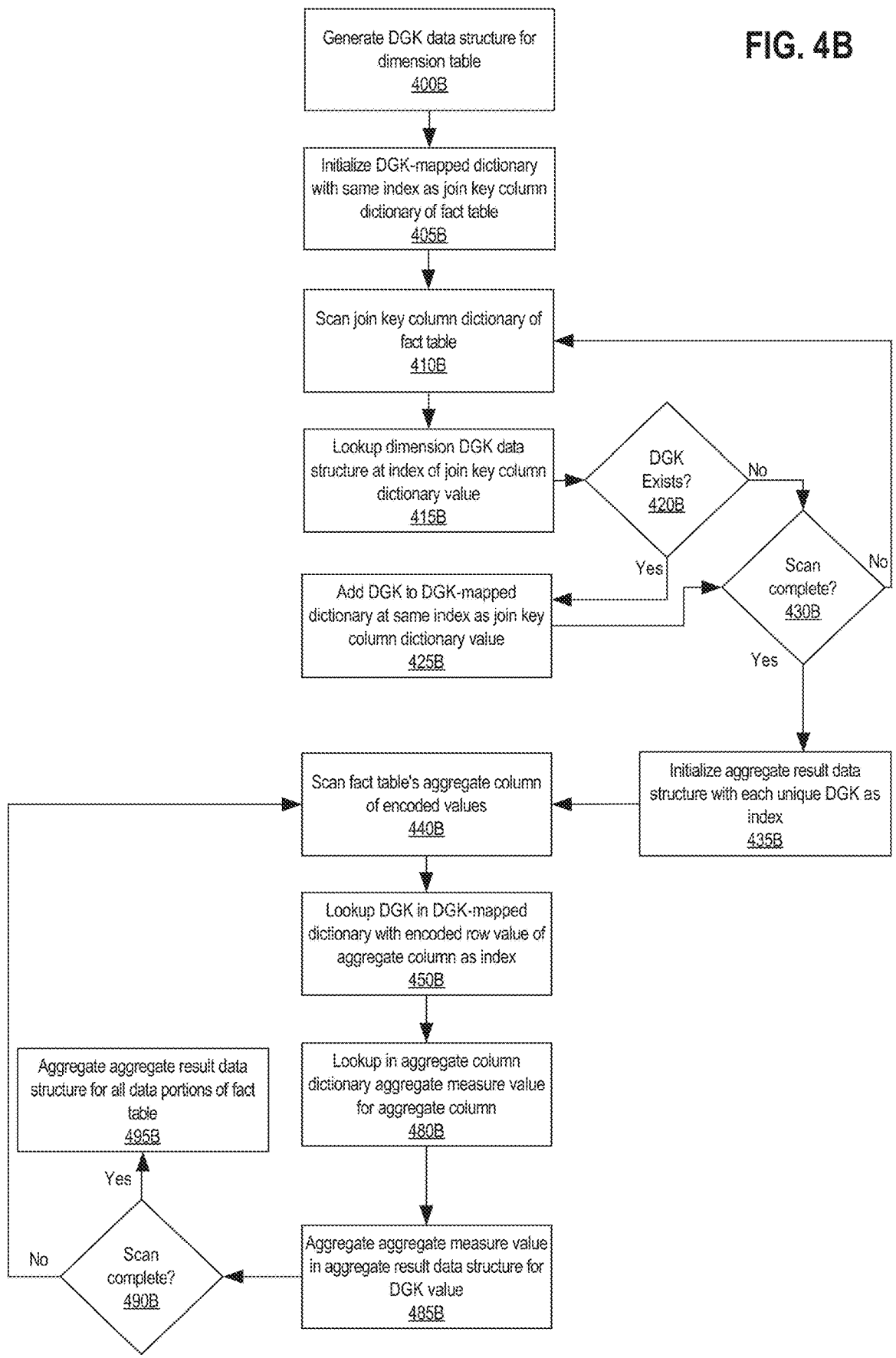

In an alternative embodiment, rather than generating the DGK-transformed vector, the DGK may be dynamically retrieved as part of the aggregation process. FIG. 4B is a flow diagram that depicts a process for performing join and aggregation operations for such an embodiment. The DBMS executes blocks 400B-430B similar to blocks 400-430 in FIG. 4A to similarly generate a DGK-mapped dictionary at block 430B. At block 435B, the DBMS initializes an aggregate result data structure that stores aggregate results for each unique DGK value. For each aggregate encoded value scanned from an aggregate measure column at block 440B, the DBMS uses the row index of the scan to look up the corresponding DGK value in the DGK-mapped dictionary at block 450B. The DBMS looks up the aggregate measure value based on the aggregate encoded value in the aggregate column dictionary at block 480B. At block 485B, for the corresponding DGK value in the aggregate result data structure, the DBMS aggregates the looked up aggregate measure value with the existing value in the aggregate result data structure for the corresponding DGK value. At block 490B, the blocks 440B-490B are repeated for each row of the aggregate column of the fact table. In an embodiment, in which multiple data portions contain the data of the fact table, multiple aggregate result dictionaries are generated for the query execution. The results from the multiple aggregate result dictionaries are further aggregated per each common DGK value, to yield the final aggregate result for the query at block 495B.

Database Management Systems

A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

In an embodiment, a DBMS may be connected to or include a cluster of compute nodes that may store one or more tables. The DBMS may manage tables stored on the cluster of compute nodes similar to managing tables stored in persistent storage.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database. Although the embodiments of the invention are described herein using the term "SQL", the invention is not limited to just this particular database query language, and may be used in conjunction with other database query languages and constructs.

A client may issue a series of requests, such as requests for execution of queries, to a database server by establishing a database session, referred herein as "session." A session comprises a particular connection established for a client to a database server, such as a database instance, through which the client may issue the series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

A multi-node database management system is made up of interconnected compute nodes that share access to the same database. Typically, the compute nodes are interconnected via a network and share access, in varying degrees, to shared storage, e.g. shared access to a set of disk drives and data blocks stored thereon. The compute nodes in a multi-node DBMS may be in the form of a group of computers (e.g. work stations, personal computers) that are interconnected via a network. Alternately, the compute nodes may be the compute nodes of a grid, which is composed of compute nodes in the form of server blades interconnected with other server blades on a rack.

Each compute node in a multi-node DBMS hosts a database server. A server, such as a database server, is a combination of integrated software components and an allocation of computational resources, such as memory, a compute node, and processes on the compute node for executing the integrated software components on a processor, the combination of the software and computational resources being dedicated to performing a particular function on behalf of one or more clients.

Resources from multiple compute nodes in a multi-node DBMS can be allocated to running a particular database server's software. Each combination of the software and allocation of resources from a compute node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving a query that aggregates a measure column of a fact table based on an aggregate function and joins the fact table with a dimension table on a join key column, wherein data of the fact table is stored in one or more storage data units:
each storage data unit storing a respective data portion of the fact table,
the respective data portion comprising one or more column vectors corresponding to one or more columns of the fact table,
each cell element of the one or more column vectors of said respective data portion corresponding to a corresponding row and a corresponding column, of the one or more columns, of the fact table, said each cell element, of the one or more column vectors, comprising a respective dictionary encoded value of a corresponding value at the corresponding column and at the corresponding row, wherein the respective dictionary encoded value is mapped to the corresponding value of said each element by a respective dictionary data structure of the corresponding column;

in response to receiving the query, for a particular data storage unit of the one or more data storage units:

based on the query, identifying a fact join key vector of the one or more column vectors of the particular data storage unit and a fact join key dictionary data structure corresponding to the fact join key vector;

generating a dictionary-grouping key mapping based on the fact join key dictionary data structure and a dense grouping key data structure, the dense grouping key data structure representing a mapping of a plurality of unique dimension join key values of the join key column of the dimension table to grouping key values of a grouping key of the dimension table;

for each measure cell element in a measure column vector that corresponds to said measure column:

selecting a dense grouping key value corresponding to a respective cell element of the fact join key vector, selecting a respective measure value for said each measure cell element, and associating the respective measure value with said dense grouping key value;

aggregating the measure column vector in said particular data storage unit by aggregating the respective measure value with other measure values that are associated with the same said dense grouping key value; and wherein the method is performed by one or more computing devices.

2. The method of claim 1, wherein the one or more storage data units are in-memory compression units (IMCUs).

3. The method of claim 1, further comprising:
prior to receiving the query, generating the respective data portion that comprises the one or more column vectors, of the one or more columns of the fact table as part of mirroring the one or more columns of the fact table from persistent storage to volatile memory.

4. The method of claim 1, wherein the fact join key vector is stored in a column-major format.

5. The method of claim 1, wherein the plurality of unique dimension join key values includes only those unique dimension join key values which rows of the dimension table satisfy criteria of one or more predicates in the query.

6. The method of claim 1, wherein the respective dictionary encoded value is encoded based on a location of an entry in the respective dictionary data structure for the corresponding value at the corresponding column and at the corresponding row.

7. The method of claim 1, wherein generating the dictionary-grouping key mapping further comprises:
comparing a plurality of unique fact join key values of the fact join key dictionary data structure with the plurality of unique dimension join key values of the dense grouping key data structure; and based on comparing the plurality of unique fact join key values of the fact join key dictionary data structure with the plurality of unique dimension join key values, generating the dictionary-grouping key mapping that maps the plurality of unique fact join key values with a sub-set the grouping key values of the dense grouping key data structure.

8. The method of claim 1, wherein the dictionary-grouping key mapping is stored in a mapped dictionary data structure that stores a mapping of unique dictionary encoded fact join key values of the fact join key dictionary data structure with corresponding dense grouping keys of a plurality of dense grouping keys representing the grouping key values of the dense grouping key data structure.

9. The method of claim 1, further comprising:
based on the query, identifying a dimension join key vector corresponding to the join key column of the dimension table and a dimension join key dictionary data structure corresponding to the dimension join key vector;

based on the dimension join key dictionary data structure and the dimension join key vector, generating the dense grouping key data structure that comprises a plurality of dense grouping key values, each entry of the dense grouping key data structure storing a mapping of one or more dense grouping key values, of the plurality of dense grouping key values to a unique dimension join key value from the plurality of unique dimension join key values.

10. The method of claim 9, wherein the dense grouping key data structure is stored on storage of a first compute node and said respective data portion is stored on storage of a second compute node different from the first compute node, and the method further comprising:
transferring a copy of the dense grouping key data structure to the storage of the second compute node from the storage of the first compute node.

11. The method of claim 9, further comprising:
based on the query, identifying a grouping key vector, of the one or more column vectors, corresponding to the grouping key of the dimension table and a grouping key data structure corresponding to the grouping key vector;

generating the dense grouping key data structure comprises:
for an entry of the dimension join key dictionary data structure, generating a corresponding entry of the dense grouping key data structure, selecting one or more encoded grouping key values that are retrieved based on a same one or more locations in the grouping key vector as one or more locations in the dimension join key vector that corresponds to the entry of the dimension join key dictionary data structure, and storing in the corresponding entry of the dense grouping key data structure a particular dense grouping key value that represents the selected one or more encoded grouping key values.

12. The method of claim 11, wherein, when more than one encoded grouping key values are selected as the one or more encoded grouping key values, the particular dense grouping key value represents a pointer to locations in which the more than one encoded grouping key values are stored.

13. A method comprising:
receiving a query that aggregates a measure column of a fact table based on an aggregate function and joins the fact table with a dimension table on a join key column, wherein data of the fact table is stored in one or more storage data units:

each storage data unit storing a respective data portion of the fact table, the respective data portion comprising one or more column vectors corresponding to one or more columns of the fact table, each cell element of the one or more column vectors of said respective data portion corresponding to a corresponding row and a corresponding column, of the one or more columns, of the fact table, said each cell element, of the one or more column vectors, comprising a respective dictionary encoded value of a corresponding value at the corresponding column and at the corresponding row, wherein the respective dictionary encoded value is mapped to the corresponding value of said each element by a respective dictionary data structure of the corresponding column;

in response to receiving the query, for a particular data storage unit of the one or more data storage units:
based on the query, identifying a fact join key vector of the one or more column vectors of the particular data storage unit and a fact join key dictionary data structure corresponding to the fact join key vector;
generating a dictionary-grouping key mapping based on the fact join key dictionary data structure and a dense grouping key data structure, the dense grouping key data structure representing a mapping of a plurality of unique dimension join key values of the join key column of the dimension table to grouping key values of a grouping key of the dimension table;
generating a transformed vector based on the dictionary-grouping key mapping and the fact join key vector, the transformed vector representing the grouping key values of the dictionary-grouping key mapping arranged according to the fact join key vector;
based on the transformed vector, aggregating a column vector in said particular data storage unit that corresponds to said measure column; and
wherein the method is performed by one or more computing devices.

14. The method of claim 13, wherein the dictionary-grouping key mapping is stored in a mapped dictionary data structure that stores a mapping of unique dictionary encoded fact join key values of the fact join key dictionary data structure with corresponding dense grouping keys of a plurality of dense grouping keys representing the grouping key values of the dense grouping key data structure.

15. The method of claim 14, wherein generating the transformed vector further comprises:
generating a cell element of the transformed vector for each cell element of the fact join key vector by selecting a dense grouping key value from an entry of the mapped dictionary data structure, that corresponds to said each cell element of the fact join key vector, and storing the selected dense grouping key value in the cell element of the transformed vector.

16. One or more non-transitory computer-readable media storing a set of instructions, wherein the set of instructions includes instructions which, when executed by one or more hardware processors, cause:
receiving a query that aggregates a measure column of a fact table based on an aggregate function and joins the fact table with a dimension table on a join key column, wherein data of the fact table is stored in one or more storage data units:
each storage data unit storing a respective data portion of the fact table,
the respective data portion comprising one or more column vectors corresponding to one or more columns of the fact table,
each cell element of the one or more column vectors of said respective data portion corresponding to a corresponding row and a corresponding column, of the one or more columns, of the fact table, said each cell element, of the one or more column vectors, comprising a respective dictionary encoded value of a corresponding value at the corresponding column and at the corresponding row, wherein the respective dictionary encoded value is mapped to the corresponding value of said each element by a respective dictionary data structure of the corresponding column;

in response to receiving the query, for a particular data storage unit of the one or more data storage units:
based on the query, identifying a fact join key vector of the one or more column vectors of the particular data storage unit and a fact join key dictionary data structure corresponding to the fact join key vector;
generating a dictionary-grouping key mapping based on the fact join key dictionary data structure and a dense grouping key data structure, the dense grouping key data structure representing a mapping of a plurality of unique dimension join key values of the join key column of the dimension table to grouping key values of a grouping key of the dimension table;
for each measure cell element in a measure column vector that corresponds to said measure column:
selecting a dense grouping key value corresponding to a respective cell element of the fact join key vector,
selecting a respective measure value for said each measure cell element, and
associating the respective measure value with said dense grouping key value;
aggregating the measure column vector in said particular data storage unit by aggregating the respective measure value with other measure values that are associated with the same said dense grouping key value.

17. The one or more non-transitory computer-readable media of claim 16, wherein the one or more storage data units are in-memory compression units (IMCUs).

18. The one or more non-transitory computer-readable media of claim 16, wherein the set of instructions includes instructions which, when executed by the one or more hardware processors, further cause: prior to receiving the query, generating the respective data portion that comprises the one or more column vectors, of the one or more columns of the fact table as part of mirroring the one or more columns of the fact table from persistent storage to volatile memory.

19. The one or more non-transitory computer-readable media of claim 16, wherein the fact join key vector is stored in a column-major format.

20. The one or more non-transitory computer-readable media of claim 16, wherein the plurality of unique dimension join key values includes only those unique dimension join key values which rows of the dimension table satisfy criteria of one or more predicates in the query.

21. The one or more non-transitory computer-readable media of claim 16, wherein the respective dictionary encoded value is encoded based on a location of an entry in the respective dictionary data structure for the corresponding value at the corresponding column and at the corresponding row.

22. The one or more non-transitory computer-readable media of claim 16, wherein the set of instructions further includes instructions which, when executed by the one or more hardware processors, cause:
comparing a plurality of unique fact join key values of the fact join key dictionary data structure with the plurality of unique dimension join key values of the dense grouping key data structure; and based on comparing the plurality of unique fact join key values of the fact join key dictionary data structure with the plurality of unique dimension join key values, generating the dictionary-grouping key mapping that maps the plurality of unique fact join key values with a sub-set the grouping key values of the dense grouping key data structure.

23. The one or more non-transitory computer-readable media of claim 16, wherein the dictionary-grouping key mapping is stored in a mapped dictionary data structure that stores a mapping of unique dictionary encoded fact join key values of the fact join key dictionary data structure with corresponding dense grouping keys of a plurality of dense grouping keys representing the grouping key values of the dense grouping key data structure.

24. The one or more non-transitory computer-readable media of claim 16, wherein the set of instructions includes instructions which, when executed by the one or more hardware processors, further cause:
based on the query, identifying a dimension join key vector corresponding to the join key column of the dimension table and a dimension join key dictionary data structure corresponding to the dimension join key vector;
based on the dimension join key dictionary data structure and the dimension join key vector, generating the dense grouping key data structure that comprises a plurality of dense grouping key values, each entry of the dense grouping key data structure storing a mapping of one or more dense grouping key values, of the plurality of dense grouping key values to a unique dimension join key value from the plurality of unique dimension join key values.

25. The one or more non-transitory computer-readable media of claim 24, wherein the dense grouping key data structure is stored on storage of a first compute node and said respective data portion is stored on storage of a second compute node different from the first compute node, and wherein the set of instructions includes instructions which, when executed by the one or more hardware processors, further cause transferring a copy of the dense grouping key data structure to the storage of the second compute node from the storage of the first compute node.

26. The one or more non-transitory computer-readable media of claim 24, wherein the set of instructions includes instructions which, when executed by the one or more hardware processors, cause:
based on the query, identifying a grouping key vector, of the one or more column vectors, corresponding to the grouping key of the dimension table and a grouping key data structure corresponding to the grouping key vector;
generating the dense grouping key data structure and further include:
for an entry of the dimension join key dictionary data structure, generating a corresponding entry of the dense grouping key data structure,
selecting one or more encoded grouping key values that are retrieved based on a same one or more locations in the grouping key vector as one or more locations in the dimension join key vector that corresponds to the entry of the dimension join key dictionary data structure, and
storing in the corresponding entry of the dense grouping key data structure a particular dense grouping key value that represents the selected one or more encoded grouping key values.

27. The one or more non-transitory computer-readable media of claim 26, wherein, when more than one encoded grouping key values are selected as the one or more encoded grouping key values, the particular dense grouping key value represents a pointer to locations in which the more than one encoded grouping key values are stored.

28. One or more non-transitory computer-readable media storing a set of instructions, wherein the set of instructions includes instructions which, when executed by one or more hardware processors, cause:
receiving a query that aggregates a measure column of a fact table based on an aggregate function and joins the fact table with a dimension table on a join key column, wherein data of the fact table is stored in one or more storage data units:
each storage data unit storing a respective data portion of the fact table,
the respective data portion comprising one or more column vectors corresponding to one or more columns of the fact table,
each cell element of the one or more column vectors of said respective data portion corresponding to a corresponding row and a corresponding column, of the one or more columns, of the fact table, said each cell element, of the one or more column vectors, comprising a respective dictionary encoded value of a corresponding value at the corresponding column and at the corresponding row, wherein the respective dictionary encoded value is mapped to the corresponding value of said each element by a respective dictionary data structure of the corresponding column;
in response to receiving the query, for a particular data storage unit of the one or more data storage units:
based on the query, identifying a fact join key vector of the one or more column vectors of the particular data storage unit and a fact join key dictionary data structure corresponding to the fact join key vector;
generating a dictionary-grouping key mapping based on the fact join key dictionary data structure and a dense grouping key data structure, the dense grouping key data structure representing a mapping of a plurality of unique dimension join key values of the join key column of the dimension table to grouping key values of a grouping key of the dimension table;
generating a transformed vector based on the dictionary-grouping key mapping and the fact join key vector, the transformed vector representing the grouping key values of the dictionary-grouping key mapping arranged according to the fact join key vector;
based on the transformed vector, aggregating a column vector in said particular data storage unit that corresponds to said measure column.

29. The one or more non-transitory computer-readable media of claim 28, wherein the dictionary-grouping key mapping is stored in a mapped dictionary data structure that stores a mapping of unique dictionary encoded fact join key values of the fact join key dictionary data structure with corresponding dense grouping keys of a plurality of dense grouping keys representing the grouping key values of the dense grouping key data structure.

30. The one or more non-transitory computer-readable media of claim 29, wherein the set of instructions further includes instructions which, when executed by the one or more hardware processors, cause:

generating a cell element of the transformed vector for each cell element of the fact join key vector by selecting a dense grouping key value from an entry of the mapped dictionary data structure, that corresponds to said each cell element of the fact join key vector, and storing the selected dense grouping key value in the cell element of the transformed vector.

* * * * *